Figure 1:
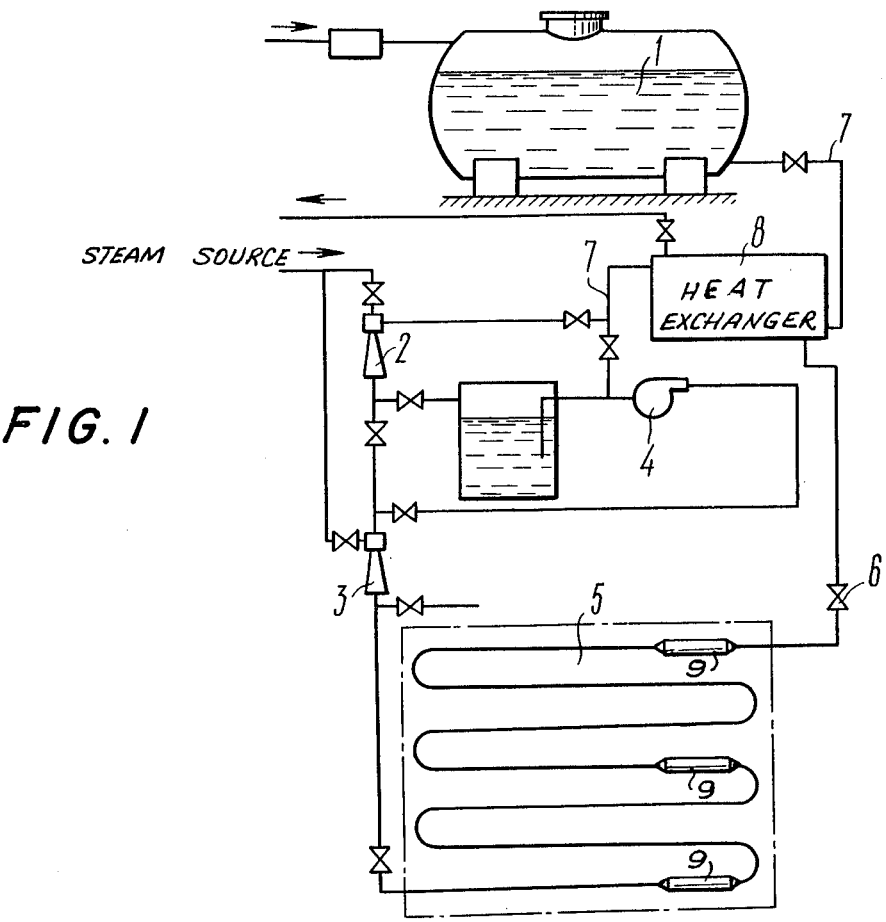

United States Patent [19]

Kokurin et al.

[11] 4,028,242

[45] June 7, 1977

[54] METHOD OF THERMAL DISINFECTION OF SEWAGE AND PLANT REALIZING SAME

[76] Inventors: Vyacheslav Alexandrovich Kokurin, Bolnichny proezd, 18, kv. 46, Pokrov Vladimirskoi oblasti; Igor Alexeevich Bakulov, Ryazansky prospekt, 82, korpus 2, kv. 79; Vitaly Mikhailovich Kotlyarov, ulitsa Koshtoiantsa, 5, kv. 69, both of Moscow, all of U.S.S.R.

[22] Filed: Feb. 6, 1975

[21] Appl. No.: 547,881

[52] U.S. Cl. .................. 210/71; 210/152; 210/178; 210/205; 210/257 R
[51] Int. Cl.² .......................................... C02C 1/00
[58] Field of Search ... 159/1 RW, DIG. 16, DIG. 31; 165/154, 163; 203/DIG. 5; 210/71, 152, 177, 178, 199, 205, 252, 257, 258, 63; 259/4 AB

[56] References Cited

UNITED STATES PATENTS

| 1,445,134 | 2/1923 | Fowler | 159/DIG. 16 |
|---|---|---|---|
| 3,155,611 | 11/1964 | Porteous | 210/152 X |
| 3,219,579 | 11/1965 | Kranz | 210/177 X |
| 3,235,003 | 2/1966 | Smith | 165/154 X |
| 3,464,917 | 9/1969 | Porteous | 210/71 X |
| 3,620,506 | 11/1971 | So | 259/4 AB |
| 3,704,006 | 11/1972 | Grout et al. | 259/4 AB |
| 3,931,012 | 1/1976 | Huse | 210/152 X |

FOREIGN PATENTS OR APPLICATIONS

| 2,137,453 | 2/1973 | Germany | 210/63 R |
|---|---|---|---|
| 876,846 | 9/1961 | United Kingdom | 210/71 |

*Primary Examiner*—Frank A. Spear, Jr.
*Assistant Examiner*—R. G. Mukai

[57] ABSTRACT

Sewage is heated to a temperature above 100° C. in two steps. In the first step, sewage is heated to a temperature not greater 100° C. and then conducted into the nozzle of a jet apparatus into which heat-carrier steam is also injected so that the sewage is therein heated to a temperature greater than 100° C., which constitutes the second step of heating. The sewage heated to said temperature is maintained in a continuous flow while being discharged from the jet apparatus, the pressure in the continuous flow corresponding to the steam saturation temperature.

2 Claims, 2 Drawing Figures

METHOD OF THERMAL DISINFECTION OF SEWAGE AND PLANT REALIZING SAME

The present invention relates to thermal methods of sewage disinfection and to thermal sewage disinfection plants.

The invention can be advantageously employed for disinfecting sewage from vegetative and spore forms of pathogenic microorganisms and disease germs capable of attacking humans and animals, as well as for freeing sewage from harmful chemicals which on exposure to high temperatures decompose to form simple non-toxic substances.

The proposed invention may find wide application in veterinary and medical microbiology, in the production of biological preparations for agricultural and medical purposes, as well as in the processing of animal husbandry products.

Under the existing sanitary standards, prior to being dumped into external sewer systems outside the sanitary zone, sewage must be completely disinfected, i.e. freed from highly pathogenic microorganisms (e.g. anthrax germs causing a galloping disease generally with a lethal outcome) and pathogenic microorganism (e.g. brucellosis, listerellosis and tuberculosis germ causing severe and prolonged diseases).

It is a widely known fact that quite a number of disease germ varieties are extremely resistant to external conditions and, being released into the environment, retain their viability for long periods of time.

Essentially, sewage disinfection implies inactivation of the microorganisms present therein. The currently available methods and means of inactivation, of which there are quite a few, may be classified into biological, chemical and physical.

The biological technique of disinfection is built around oxidative processes triggered by exposure of microorganisms to oxygen. It has been proved, however, that biological disinfection of sewage fails to destroy all disease germs.

Furthermore, biological disinfection may entail massive pollution of the environment with disease germs carried outside with spray and evaporating moisture. For these reasons, the biological method must be ruled out as a chief procedure for the disinfection of sewage infected with disease germs.

Chemical inactivation procedures cannot do without such processes as clarification and neutralization of liquid sewage and redisinfection of the sludge.

The chemical method of inactivation has the following main disadvantages:

the inactivation agents react with the organic and inorganic components of sewage and lose their chemical activity;

the bactericidal effect of the procedure is largely neutralized should sewage happen to contain colloids and organic inclusions; and the exposure of sewage to inactivation agents must be long enough (up to several scores of hours) if the bactericidal effect is to be as required.

The use of numerous and variegated chemical inactivation agents, including those produced by electrolysis, fails to obviate the dramatic disadvantages listed hereabove, so that chemical inactivation obviously fails to qualify as a chief method of sewage disinfection.

As for the physical technique of disease germ inactivation, several methods are available, including ultraviolet irradiation, ultrasonic treatment, ionizing irradiation with gamma-, beta- and alpha-rays, and treatment in an electromagnetic field. The latter methods are of certain interest for research purposes, but as their bactericidal effect is insufficiently high and their economics prohibitive they are not used on a commerical scale for sewage disinfection purposes.

Of all the currently known sewage disinfection methods heat treatment is the most effective one. Much research and many years of practical experience indicate that the thermal disinfection method offers a high bactericidal effectiveness. The thermal disinfection technique may use high-temperature fuel combustion products and high-temperature heat carriers, such as water vapor, as the thermal agents.

Sewage disinfection has so far been carried out in tank plants operating on a batch principle. Sewage is collected in large tanks, heated to 130° C. by bubbling steam through the liquid, allowed to stand thereafter for a specified period of time, and is then, having been previously cooled down to 45° C, conveyed to an external sewer.

However, the extensive body of experience with this method indicates that its sanitary reliability is inadequate and that it has some serious operating disadvantages:

the process proceeds at a low rate, with the temperature gradient of the liquid being heated being as low as 2° to 5° C per minute;

the process uses a considerable quantity of heat energy, which detracts from the efficiency of operation of the process equipment;

the process equipment operates at a low efficiency and a negligibly small plant use factor, what with the prolonged operating cycle, the inevitable formation of ballast liquid by condensing steam, and the impossibility of applying a continuous principle of operation; and periodic bleedoffs for sewage heating purposes involve intermittent loading of the boilers, adversely affecting their performance.

Moreover, special research has shown that microorganisms have different resistance responses to heat treatment in steam and in a liquid medium. Thus, even exposed to a temperature of 140° to 150° C for periods of 30 minutes and longer, spore microorganisms in a steam medium lose none of their activity, whereas in a liquid medium (superheated water) the bacterial spores of the same initial concentration are destroyed within 1 to 1.5 minutes at 110°.

However, in the tank-type disinfection plants currently in use, it is impossible to provide conditions conductive to effective germ destruction.

Thus, (a) the sewage collection tank, even filled, will invariably have an air pocket to accommodate condensed steam; and (b) the numerous connecting pipes and manholes are likewise filled with an air-steam mixture though the tank may be filled to the brim with the liquid.

Besides, these and some other connecting pipes are outside of the heat zone so that the microorganisms present in them can survive even after the bulk of the liquid has been heated to 140° C. at a pressure of 4 bars and maintained at these conditions for 1 hour.

There exists a method of sewage disinfection with heat-carrier steam in jet apparatus (Monatskeffe fur Veterinarmedizin, 1969, 24, No. 20, pp. 761–9), whereby sewage is collected in a collecting tank and then disinfected by a chemical method, whereafter the sewage is supplied into a jet apparatus to be heated by heat-carrier steam to a temperature not exceeding 100° C. The thus heated sewage is delivered into a vessel and kept there for a time sufficient to achieve complete disinfection. Then the forced cooled disinfected sewage is drained off from the latter vessel.

This technique is implemented in a plant comprising a sewage collecting tank, a chemical disinfection unit and a jet apparatus connected with the disinfection unit by a pipeline. The jet apparatus is formed as a housing with a nozzle wherethrough heat-carrier steam is fed into the mixing chamber of the apparatus. The mixing chamber of the jet apparatus is connected, via a sleeve provided on the housing and a pipeline, with the aforementioned disinfection unit wherefrom sewage is delivered into the jet apparatus to be heated by heat-carrier steam.

The plant also comprises a vessel wherein the sewage heated by heat-carrier steam is kept for a period of time sufficient for complete disinfection of the polydispersed sewage particles.

Said known thermal sewage disinfection technique has a serious disadvantage which consists in that the process of disinfection is carried out at a low temperature, not exceeding 100° C., which is manifestly insufficient to reliably inactivate spore bacteria.

One of the chief drawbacks of the prior art plants is the need for a special vessel wherein to hold the sewage heated by heat-carrier steam till complete disinfection. This step of the process prevents the use of a continuous principle for the disinfection of sewage.

Besides, with sewage being heated in a single step in a single jet apparatus by an injected stream of heat-carrier steam, temperatures in excess of 110° C. can only be achieved at the expense of intense vibration of the jet apparatus and water hammer effects, so that the disinfection process cannot in fact be carried out at effectively high temperatures.

It is an object of the present invention to obviate the above-mentioned disadvantages.

It is another object of the present invention to provide a thermal sewage disinfection method which insures effective inactivation of both vegetative and spore forms of microorganisms.

It is still another object of the present invention to provide a thermal sewage disinfection method which could be effected as a continuous process.

It is a further object of the present invention to provide a thermal sewage disinfection plant which insures a stable quality of disinfection in terms of both vegetative and spore forms of microorganisms.

It is yet another object of the present invention to provide a thermal sewage disinfection plant which is adapted for continuous operation at minimized energy consumption rates.

The foregoing objects are attained by the provision of a thermal sewage disinfection method employing jet apparatus, whereby sewage is heated in a jet apparatus by heat-carrier steam, whereafter the heated sewage is allowed to stand till complete disinfection takes place, in which, in accordance with the present invention, sewage is subjected to two stages of heating, so that at the first stage sewage is heated to a temperature of not higher than 100° C., whereas at the second stage of heating the preheated sewage is fed into the jet apparatus via the nozzle thereof to provide a vacuum and to thereby insure the injection of heat-carrier steam, and then the sewage is therein heated to a temperature in excess of 100° C., and said seasoning of the sewage is effected while draining same off in a continuous stream maintained at a pressure corresponding to the steam saturation temperature.

In accordance with the present invention, an alternative embodiment of the proposed method comprises heating sewage at the first stage in a jet apparatus by means of heat-carrier steam being fed into the jet apparatus through the nozzle thereof to provide a vacuum and thereby insure the injection of the sewage.

The proposed thermal sewage disinfection method insures inactivation of both vegetative and spore forms of microorganisms in a continuous process, the throughput of the process being double that of the prior art method of thermal disinfection of sewage.

In addition, sewage heating in the first step of the process is preferably done with the use of heat recovered from the completely disinfected sewage.

Such a flowchart of heating permits of a 50-percent energy economy as against the known technique.

Still another embodiment of the present invention resides in that at certain points along said continuous sewage flow there are provided eddies which impart a helical motion to the flow, inducing centrifugal forces which drive the dispersed inclusions of the sewage toward the peripheral layer of the flow.

Owing to the latter feature, the proposed method permits handling sewage containing polydispersed inclusions 1 to 8 mm in size, requiring no additional process time.

The method of the present invention is preferably implemented in a plant comprising a sewage collecting tank connected by a pipeline with an intermittently operating jet appartus and thence with a pump delivering sewage under pressure to the nozzle of a second jet apparatus designed for heating the sewage in the second step of the process, as well as a pipe coil to remove the heated sewage from the second jet apparatus and provide for the seasoning thereof in a flow under pressure.

An alternative embodiment of the proposed plant is distinguished by virtue of the fact that the jet apparatus for heating sewage in the second step of the process is connected by a pipeline with said sewage collecting tank, the pipeline being provided, upstream of the pump providing for the delivery of sewage under pressure, with a heat exchanger for the recovery of the heat of the completely disinfected sewage, and said heat exchanger is connected by a pipeline with the outlet of said pipe coil.

The plant of the present invention operates on a continuous principle and hence has double the throughput and needs half again as little energy as the prior art plant implementing the prior art method of thermal sewage disinfection. Besides, the proposed plant ensures high sanitary-hygienic standards of the process.

In accordance with the present invention, it is preferred that at certain points along the pipe coil there should be provided cyclones for swirling the sewage flow and imparting a helical motion thereto.

With such cyclones being provided in the pipe coil, the plant of this invention can be employed to disinfect sewage containig polydispersed inclusions 1 to 8 mm in size, without any detriment to its normal operating efficiency.

Further objects and advantages of the present invention will become apparent from the following detailed description of the proposed thermal sewage disinfection method as well as of the proposed plant realizing same, which description is taken in conjunction with the accompanying drawing schematically illustrating said plant.

The thermal sewage disinfection method, in accordance with the present invention, comprises heating sewage in two steps to a temperature necessary and sufficient for the inactivation of both vegetative and spore microorganisms. In the first step, sewage may be heated by any known technique, e.g. in a jet apparatus by means of heat-carrier steam which is fed into the jet apparatus via the nozzle thereof, creating a vacuum therewithin and thereby causing sewage to be injected thereinto. As has been pointed out, the maximum temperature that can be practically attained in this way does not exceed 100° C.

However, at temperatures below 100° C. only vegetative forms of microorganisms, such as *E. coli, Staphylococcus aureus*, Brucella or Pasteurella, are destroyed, whereas spore microorganisms, e.g. anthrax or tetanus germs, sustain no damage, particularly if they are enclosed in dispersed particles.

Heating of sewage to a temperature in excess of 100° C., with the sewage being steam-injected, has the disadvantage of service instability, since sewage tends to boil in the jet apparatus, with the result that the air-stream mixture rapidly increases in volume, causing a rise in pressure which entails intense vibration and water hammer effects.

We have found that if sewage preheated to within 100° C. is fed into a jet apparatus of a known design via the nozzle thereof, a vacuum is thereby produced within the apparatus and heat-carrier steam is thereby caused to be injected into the apparatus. In this way it is possible to heat sewage to a temperature higher than 100° C.

In our view, elimination of the vibratory and water hammer effects observed in such a case is attributable to the specific pattern of heat and mass exchange between heat-carrier steam and the sewage flow. Condensation of heat-carrier steam on the surface of the sewage flow provides for its gradual heating in the jet apparatus, and the final step of heating, to a temperature on the order of 140° C., is carried out in the turbulent sewage flow outside of the jet apparatus.

Thus, the method of the present invention ensures inactivation of spore microorganisms as well.

However, it is widely known that merely heating sewage to a temperature above 100° C. is no guarantee of complete disinfection success; what with it dispersed inclusions, sewage must be maintained at the temperature attained, or seasoned, for some time before being dumped outside.

According to one feature of the present invention, sewage seasoning is to be effected while the sewage flow is being continuously drained from the jet apparatus wherein a temperature above 100° C. has been reached. Said continuous sewage flow is maintained at a pressure which corresponds to the steam saturation temperature.

It is a common fact that a definite boiling point, known as the saturation temperature, corresponds to each pressure value. Thus, at a temperature of 100° C. the pressure is 0.03 bar; at a temperature of 120° C. the pressure is 2.02 bars.

The time during which sewage is exposed to a temperature higher than 100° C. should be sufficient to totally inactivate all forms of microorganisms present both in the liquid phase and in the dispersed inclusions of the sewage.

We have determined that the minimum time of exposure to a temperature of 140° C. is 1 minute. Generally, the time of exposure depends on the sewage temperature determined, in turn, by the flow pressure.

Exposure to a temperature of 140° C. for longer than 15 minutes becomes impracticable.

Bearing in mind that sewage invariably contains dispersed inclusions, we suggest that during the seasoning period at certain points along the continuous sewage flow there should be set up eddies imparting a helical motion to the flow which will induce centrifugal forces driving the dispersed sewage inclusions toward the peripheral layer of the flow.

Said eddies set up in the sewage flow are guaranteed to ensure total inactivation of all vegetative and spore microorganisms present in the dispersed sewage inclusions.

The reason for this assurance should be sought in the fact that as dispersed inclusions move toward the peripheral layer of the sewage flow they lose some speed as compared to the inner, or central, flow layers, so that the dispersed inclusions are exposed to high temperatures for somewhat longer periods of time. Thus, for example, at a flow velocity of 0.13 m/sec., the dispersed inclusions in the peripheral layer move at only 0.05 m/sec.

To go back a little, it is our intention to demonstrate that sewage heating in the first step — to a temperature not exceeding 100° C. — can be effected, in accordance with the present invention, by the recovered heat of the completely disinfected sewage. To put it otherwise, one feature of the invention enables the means for heating sewage to a temperature not exceeding 100° C., e.g. the first-step jet apparatus, to be switched off after some time with all subsequent heating henceforth done using the recovered heat of the disinfected sewage.

After said seasoning in a continuous flow, the completely disinfected sewage retains a sufficiently high temperature, so that by recovering its heat the sewage being treated can be heated to a temperature not exceeding 100° C. This temperature is quite enough to provide for the successful heating of the sewage in the second step by the method of the present invention.

Owing to such a flowchart of heating, a considerable energy economy is effected in the first step of sewage heating.

It has been found in special investigations that, given one and the same temperature of heat treatment, the type of medium determines the specific duration of exposure if all microorganisms are to be effectively destroyed. In a liquid medium, germs are destroyed 5 to 10 times faster than in an air-stream medium since the rate of heat and mass exchange in liquids is much higher than that in an air-stream mixture. For this reason we have developed a plant design which realizes the proposed sewage disinfection method with the use of a liquid medium.

Figure 2:
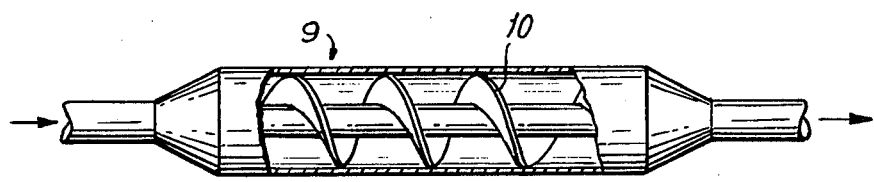

This is illustrated in the attached drawing, wherein:

FIG. 1 is a diagrammatic illustration of apparatus according to the invention, and FIG. 2 is a diagrammatic illustration, partly broken away, of a portion of an element in the apparatus of FIG. 1.

The method of this invention is preferably implemented in a plant which comprises a tank 1 for collecting sewage containing vegetative and spore forms of microorganisms. Said tank 1 is connected by a pipeline with an intermittently operating jet apparatus 2 for heating sewage by means of heat-carrier steam to a temperature below 100° C. The present invention makes it possible to employ known types of jet apparatus formed as a housing with a nozzle and connecting pipes wherethrough sewage and heat-carrier steam is delivered into the chamber of the apparatus, the jet apparatus 2 being connected with a source of heat-carrier steam supply via the nozzle of the apparatus, whereas the tank 1 for sewage collection is connected with the jet apparatus 2 via a pipe connection thereof.

The output of the jet apparatus 2 is connected by a pipeline with the nozzle of a jet apparatus 3 designed for heating sewage to a temperature higher than 100° C. by means of heat-carrier steam, the design of the jet apparatus 3 being similar to that of the jet apparatus 2. The connecting pipe of the jet apparatus 3 is connected with a heat-carrier steam source of supply (not shown in the drawing). Besides, in accordance with the present invention, the pipe-line is provided with an electric pump 4, the capacity thereof being dependent on the amount of sewage to be handled. The pump 4 is designed for forcing sewage into the jet apparatus 3. The outlet of the jet apparatus 3 is connected by a pipeline with a pipe coil 5 designed for maintaining the heated sewage in a flow under pressure. The pipe coil 5 is constructed from seamless hot-rolled or arc-welded pipes of a diameter equal to or greater than the pipeline diameter. The length of the pipe coil 5 is calculated on the basis of the plant throughput as well as the exposure needed to completely inactivate the microorganisms contained both in the bulk of the sewage liquid and in its dispersed inclusions. The outlet portion of the pipe coil 5 is provided with a device 6 for controlling the flow through the coil e.g. a valve. The device 6 is designed for maintaining the sewage flow through the coil at a temperature equal or close to that of the sewage emerging from the second heating stage. Naturally, as the cross-section of the outlet portion of the coil 5 decreases, the pressure therein rises, causing a rise in temperature. Thus, at a pressure of the sewage in the pipe coil 5 equal to 1 gage atmosphere, the temperature of the sewage being treated is 100° C; at 1.46 gage atmospheres, the temperature is 120° C; at 2.75 gage atmospheres, the temperature is 130° C.

The present invention provides for the possibility of equipping certain portions of the pipe coil 5 with cyclones whose number is determined by the length of the pipe coil 5. The cyclones are preferably mounted at 50 m intervals. These cyclones swirl the sewage flow and impart the required helical motion thereto. Each cyclone comprises a metallic helical insert fastened in the pipe coil 5 by means of locking devices.

In accordance with the present invention, the tank 1 is connected with the jet apparatus 3 by a pipeline 7, with a tubular heat exchanger 8 of any known variety installed upstream of the pump 4. The heat exchanger 8 is connected by a pipeline with the outlet of the pipe coil 5.

The plant of this invention is amenable, in accordance with the inventon, to closed-loop and remote control. The sewage treatment system of this invention ensures that no untreated sewage will find its way to the external sewer and that any amount of sewage will be recycled, if same should be required.

The plant of the present invention operates in the following manner.

Sewage arriving from the sewer is routed to an apparatus (not shown in the drawing) wherein all dispersed inclusions are comminuted to a particle size of 4 to 6 mm, whereafter the sewage is directed to the collecting tank 1. Simultaneously heat-carrier steam at a temperature of 140° to 150° C. from an external source of supply is injected at a pressure of from 3 to 5 bars into the jet apparatus 2 through the nozzle thereof. Owing to the above principle of steam supply, a vacuum is produced within the heating chamber of the jet apparatus 2 whereby the sewage from the tank 1 is drawn into the jet apparatus 2 through the connecting pipe thereof. The sewage is mixed with the heat-carrier steam in the jet apparatus 2 so that its temperature rises to within 100° C., at which temperature all vegetative forms of microorganisms, such as *E.coil, Staphylococcus aureus*, Brucellas or Pasteurellas, are destroyed.

Sewage heating by injected steam to temperatures in excess of 100° to 100° C. is accompanied by vibration and water hammer effects. In order to obviate this inconvenience, sewage is heated to a temperature of 100° to 110° C. in a second step. To this end, the heated sewage is supplied by the pump 4, which creates a pressure of 3 to 5 bars, to the nozzle of the jet apparatus 3 constituting the second stage of heating. The vacuum produced by the stream of sewage being ejected from the nozzle of the apparatus 3 causes heat-carrier steam to be injected from an external source of supply into the jet apparatus 3 via the connecting pipe thereof. Intermixing with the heat-carrier steam, the sewage having a temperature below 100° C. is heated to a temperature above 100° C.

Sewage exposure to said temperature for 1 to 5 minutes effectively destroys spore forms of microorganisms, but, bearing in mind that there might be germs in the protein medium of dispersed inclusions offering them heat protection, the exposure time is to be prolonged to 15 minutes.

In order to provide for the continuous pattern of the disinfection process, the sewage seasoning is effected in a continuous flow for as long as it takes to ensure total destruction of all forms of microorganisms.

To this end, the sewage heated to a temperature above 100° C. is directed to flow through the pipe coil 5.

In order that the sewage temperature in the pipe coil 5 may be kept above 100° C., the device 6 installed at the outlet of the coil 5 is used to control the cross-sectional area of the pipe coil 5. Thus, the sewage being exposed to an elevated temperature flows at an excess pressure corresponding to the steam saturation temperature, said pressure being like-wise provided with the aid of the pump 4.

In addition, the sewage directed into the pipe coil 5 is made to swirl as it flows by cyclones which are mounted at, for instance, 25 m intervals within the coil and fixed thereto by means of locking devices. The sewage flow is thereby given a helical motion whose centrifugal forces drive the dispersed inclusions of the sewage toward the periphery of the flow. Naturally, the peripheral layer of the flow moves at a somewhat slower velocity than its central layers. Thus, at a cross-section of the pipe coil 5 equal to 300 mm, the central layer of the flow moves at up to 0.13 m/sec., whereas the dispersed inclusions moving in the peripheral layer of the flow have a velocity of 0.05 m/sec. Owing to this feature, all dispersed inclusions of the sewage flow are exposed to an elevated temperature for a longer period of time than the liquid phase. Thus, the invention is seen to provide reliable conditions for maximal disinfection of sewage.

With a view to reducing the amount of energy needed for sewage heating, the invention provides that the completely disinfected sewage is directed via a pipeline to the heat exchanger 8 whereinto sewage from the tank 1 is simultaneously supplied, the jet apparatus 2 being switched off. The fresh sewage heated by the heat of the completely disinfected sewage is drained from the heat exchanger 8 via the pipeline 7 and into the jet apparatus 3 to be heated by the above-described method.

EXAMPLE 1

The sewage to be subjected to the disinfection procedure contains dispersed organic inclusions comminuted to a particle size of 4 to 6 mm and infected with vegetative microorganisms as well as with the spores of an anthrax-type germ, the total concentration of microorganisms in the sewage being 100 mln/ml.

The sewage is supplied via the pipeline 7 to the jet apparatus 2. Simultaneously, heat-carrier steam having a temperature of 140° C. is supplied to the nozzle of the jet apparatus 2 at a pressure of 3.6 bars. The vacuum of $10^{-1}$ mm Hg produced by the heat-carrier steam in the jet apparatus chamber causes the sewage from said pipeline to be injected into the jet apparatus chamber to be heated therein to a temperature of 80° C. Then, with the aid of the pump 4, the sewage is supplied to the nozzle of the jet apparatus 3 at a pressure of 4 bars. The vacuum produced by the sewage flow heated to a temperature of 80° C. causes heat-carrier steam to be injected into the chamber of the jet apparatus 3 to heat the sewage therein to a temperature of 130° C. Then the sewage is directed for seasoning into the pipe coil 5 of length 200 meters. As the sewage stream flows through the coil at a pressure of 4 bars and the dispersed inclusions are periodically driven toward the periphery of the flow (by the centrifugal forces induced by the cyclones 9 in the coil 5), the dispersed inclusions are heated through and the microoganisms they carry are inactivated.

The time needed to inactivate the spores of microorganisms having no protein sheath is 0.5 to 1 minute, whereas to destroy the spores of microorganisms enclosed in dispersed inclusions it takes 15 minutes. 15 Minutes was needed to disinfect 20 cu.m. of sewage.

EXAMPLE 2

The sewage to be disinfected contains dispersed organic inclusions comminuted to a particle size of 4 to 6 mm and infected with vegetative forms of microorganisms as well as with the spores of the hay bacillus, the overall concentration of microorganisms being 200 mln/ml.

The sewage is supplied via the pipeline to the jet apparatus 2. Simultaneously heat-carrier steam having a temperature of 150° C. is supplied to the nozzle of the jet apparatus 2 from an external source of supply at a pressure of 4.8 atm. The vacuum of $10^{-2}$ mm Hg produced in the jet apparatus chamber by the steam causes the sewage from the above-mentioned pipeline to be injected into the chamber of the jet apparatus 2 wherein it is heated to a temperature of 90° C. Then, with the aid of the pump 4, the sewage is supplied at a pressure of 5 bars to the nozzle of the jet apparatus 3. The vacuum produced by the stream of sewage heated to a temperature of 90° C. causes heat-carrier steam having a temperature of 150° C. to be injected into the chamber of the jet apparatus 3, so that the sewage is therein heated to a temperature of 140° C.

Then the sewage is directed for seasoning into the pipe coil 5 having a cross-sectional area of 300 mm and a length of 200 m. As the sewage stream flows through the coil at a pressure of 3 to 4 bars and a temperature of 140° C., all microorgansims are inactivated, those contained in dispersed inclusions being destroyed owing to the fact that the velocity of the dispersed inclusions driven toward the peripheral layer of the flow is considerably lower than that of the central layers, or liquid phase, of the flow. Thus, while the central layers move at a velocity of 0.13 m/sec., the velocity of the external layer is only 0.05 m/sec.

The displacement of the dispersed particles toward the periphery of the flow is provided for by the centrifugal forces arising due to the action of cyclones 9 mounted inside the pipe coil 5 at 25 m intervals.

The completely disinfected sewage at a pressure of 3 to 4 bars is directed from the pipe coil 5 via the pipelines to the heat exchanger 8 whereinto fresh sewage to be disinfected is supplied from the tank 1. The sewage arriving for heat treatment is heated by the recovered heat of the completely disinfected sewage to a temperature of 85° C. and directed via the pipeline 7 to the jet apparatus 3.

Subsequently, the disinfection process proceeds in the manner described hereabove, with the need for the jet apparatus 2 now obviated and the apparatus 2 being switched off.

From the heat exchanger 8 the completely disinfected sewage is dumped into an external sewer.

It took 15 minutes to disinfect 20 cu.m. of sewage.

EXAMPLE 3

The sewage to be disinfected contains dispersed organic inclusions comminuted to a particle size of 4 to 6 mm and infected with the spores of the hay bacillus, anthrax-type germs and pseudo-anthrax germs as well as with the vegetative forms of *E.coli* and *Staphylococcus aureus*, the overall concentration of microorganisms in the sewage being 200 mln/ml.

The sewage to be disinfected is supplied via the pipeline to the jet apparatus 2. Simultaneously, heat-carrier steam having a temperature of 150° C. is supplied at a pressure of 4.8 bars from an external source of supply to the nozzle of the jet apparatus 2. The heat-carrier steam produces a vacuum of $10^{-2}$ mm Hg in the chamber of the jet apparatus, and the sewage is drawn thereby from the above-mentioned pipeline into the chamber of the jet apparatus 2 and heated therein to a temperature of 80° C. Then, with the aid of the pump 4, the sewage is conveyed at a pressure of 5 bars to the nozzle of the jet apparatus 3. The vacuum produced by the jet of sewage heated to a temperature of 80° C. causes heat-carrier steam having a temperature of 150° C. to be injected into the chamber of the jet apparatus 3, and the sewage is thereby heated therein to a temperature of 140° C.

Then the sewage is directed for seasoning into the pipe coil 5 having a cross-sectional area of 300 mm and a length of 200 m. As the sewage stream flows therethrough at a pressure of 3 to 4 bars and the dispersed inclusions are periodically driven toward the periphery of the flow (under the action of centrifugal forces induced by the cyclones 9 in the pipe coil 5), the dispersed inclusions are heated through and the microorganisms sheathed thereby are inactivated.

The time required to destroy the spores of microorgansims enclosed in dispersed inclusions 4 to 6 mm in size and provided with protein sheathing equals 15 minutes.

What is claimed is:

1. A plant operable with a source of steam for thermal disinfection of sewage, which plant comprises: a tank for collecting sewage; a first pipeline connected to said tank at an outlet thereof; an intermittently operable jet apparatus having a nozzle coupled to said source of steam and connected by said first pipeline with said tank to inject sewage into the jet apparatus to preheat the sewage to a temperature not greater than 100° C; a pump having an inlet and an outlet; means connecting the inlet of said pump to the outlet of said first jet apparatus; a second pipeline connecting the first pipeline directly to the inlet of the pump; valve means in said second pipeline and in the means connecting the outlet of the jet apparatus to the inlet of the pump for controlling the flow to the inlet of said pump; a second jet apparatus having a nozzle coupled to said outlet of the pump such that sewage is pumped through said second jet apparatus under pressure; said second jet apparatus being connected to said steam source for induction of steam under the effect of the pumped sewage for heating the sewage by the inducted steam to a temperature greater than 100° C.; a pipe coil connected to the outlet of said second jet apparatus and including further valve means for controlling discharge of sewage from said coil such that the sewage received from said second jet apparatus flows continuously through said coil at a temperature above 100° C. and at a pressure corresponding to the steam saturation temperature whereby the sewage is disinfected; a heat-exchanger connected to the outlet of the pipe coil and to said first pipeline at a location upstream of said pump such that heat is extracted from the disinfected sewage discharged from the coil and is transferred to the sewage in the first pipeline; and cyclones in said pipe coil for imparting a helical motion to the sewage flow therein.

2. A method for the thermal disinfection of sewage employing first and second jet apparatuses and a source of steam, said method comprising heating sewage in the jet apparatuses by steam, followed by circulating said heated sewage along a continuous flow path to obtain complete disinfection thereof, and heating being carried out in first and second stages; in the first stage, said sewage being inducted into the first jet apparatus and heated to a temperature of below 100° C. by steam supplied under pressure by said steam source; in the second stage, said sewage pre-heated to a temperature below 100° C. being additionally heated to a temperature of above 100° C. by pumping the pre-heated sewage through the second jet apparatus to induct steam also supplied by said steam source; maintaining the sewage at a temperature of about 100° C. in a continuous flow until complete disinfection of the sewage is carried out by effecting a continuous discharge of the sewage at a controlled pressure corresponding to the steam saturation pressure, imparting at certain points along said continuous flow a helical motion to said sewage flow to produce centrifugal forces for the displacement of dispersed inclusions toward the peripheral surface of said sewage flow, and effecting heat exchange between the disinfected discharged sewage and raw sewage flowing to the first heating stage.

* * * * *